(12) United States Patent
Rosenthal et al.

(10) Patent No.: US 7,521,680 B1
(45) Date of Patent: Apr. 21, 2009

(54) ELECTROMAGNETIC SPECTRAL-BASED IMAGING DEVICES AND METHODS

(76) Inventors: Eric Dean Rosenthal, 191 Beacon Hill Rd., Morganville, NJ (US) 07751; Richard Jay Solomon, P.O. Box 187, Monson, MA (US) 01057; Clark Eugene Johnson, 5657 Steeplechase Dr., Waunakee, WI (US) 53597

( * ) Notice: Subject to any disclaimer, the term of this patent is extended or adjusted under 35 U.S.C. 154(b) by 598 days.

(21) Appl. No.: 10/999,741

(22) Filed: Nov. 30, 2004

Related U.S. Application Data

(60) Provisional application No. 60/527,328, filed on Dec. 5, 2003, provisional application No. 60/529,691, filed on Dec. 15, 2003.

(51) Int. Cl.
*G01J 1/04* (2006.01)
(52) U.S. Cl. .............................. 250/336.1; 343/700 R; 343/703; 343/772; 343/778; 977/700; 977/902
(58) Field of Classification Search ........................ None
See application file for complete search history.

(56) References Cited

U.S. PATENT DOCUMENTS

| | | | | |
|---|---|---|---|---|
| 3,932,814 A | * | 1/1976 | Niki | 455/147 |
| 5,202,692 A | * | 4/1993 | Huguenin et al. | 342/179 |
| 5,796,506 A | * | 8/1998 | Tsai | 398/204 |
| 6,469,682 B1 | * | 10/2002 | de Maagt et al. | 343/909 |
| 6,777,684 B1 | * | 8/2004 | Volkov et al. | 250/341.1 |
| 7,027,743 B1 | * | 4/2006 | Tucker et al. | 398/204 |
| 7,092,645 B1 | * | 8/2006 | Sternowski | 398/204 |
| 2006/0111619 A1 | * | 5/2006 | Castiglione et al. | 600/300 |

OTHER PUBLICATIONS

Kostiuk, T. ",Heterodyne Spectroscopy in the Thermal Infrared Region: A Window on Physics and Chemistry," NASA Goddard Space Flight Center, Proceedings of the International Thermal Detectors Workshop, Jun. 19-20, 2003, on web at ssed.gsfc.nasa.gov/code693/tdw03/proceedings/docs/session_7/Kostiuk.pdf.

Wang, Y, "Receiving and transmitting light-like radio waves: Antenna effect in arrays of aligned carbon nanotubes." Applied Physics Letters, Sep. 27, 2004, vol. 85, No. 13, pp. 2607-2609.

* cited by examiner

*Primary Examiner*—David P Porta
*Assistant Examiner*—Yara B Green

(57) ABSTRACT

This invention teaches how to fabricate a new type of full-spectra wavelength detector and spectrum analyzer in the form of antennas that make use of the wave properties of light. The detector's frequency detection range is controlled through the fabrication process. By miniaturizing the antenna detectors to the nanometer range and arranging them in an array a unique, full-spectrum imaging sensor is created.

10 Claims, 9 Drawing Sheets

Color detecting pixel element in the form of a tapered conical antenna.
Based on Johnson, Richard C., Antenna Engineering Handbook, 3rd edition, 1961. New York: McGraw-Hill. Page 13-13.

Fig 1: Color detecting pixel element in the form of a tapered conical antenna. Based on Johnson, Richard C., Antenna Engineering Handbook, 3$^{rd}$ edition, 1961. New York: McGraw-Hill. Page 13-13.

FIG. 2 . Pictorial representation of human cone, extracted from figure in Oyster, Clyde W., The Human Eye Structure and Function, 1999. Sunderland: Sinauer, p. 565.

FIGURES 5A and 5B
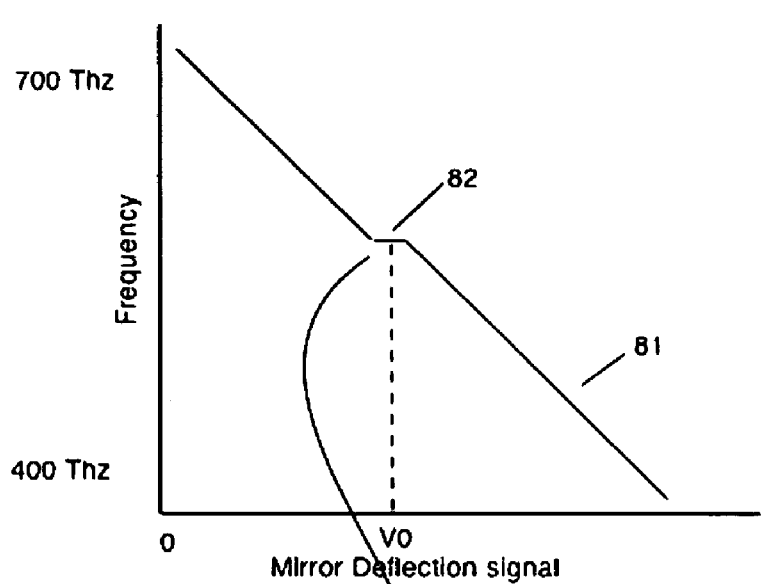
Fig. 5A
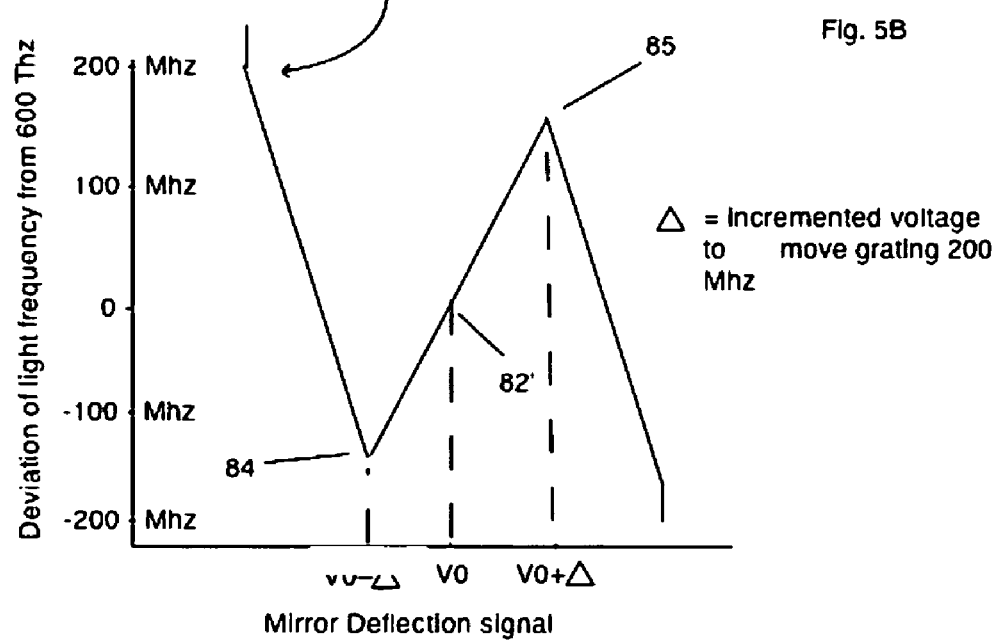
Fig. 5B

Fig. 6 Radiation pattern of Conical Antenna at 500 Thz. Mathematically modeled by Dennis Prather at University of Delaware Aug 2004.
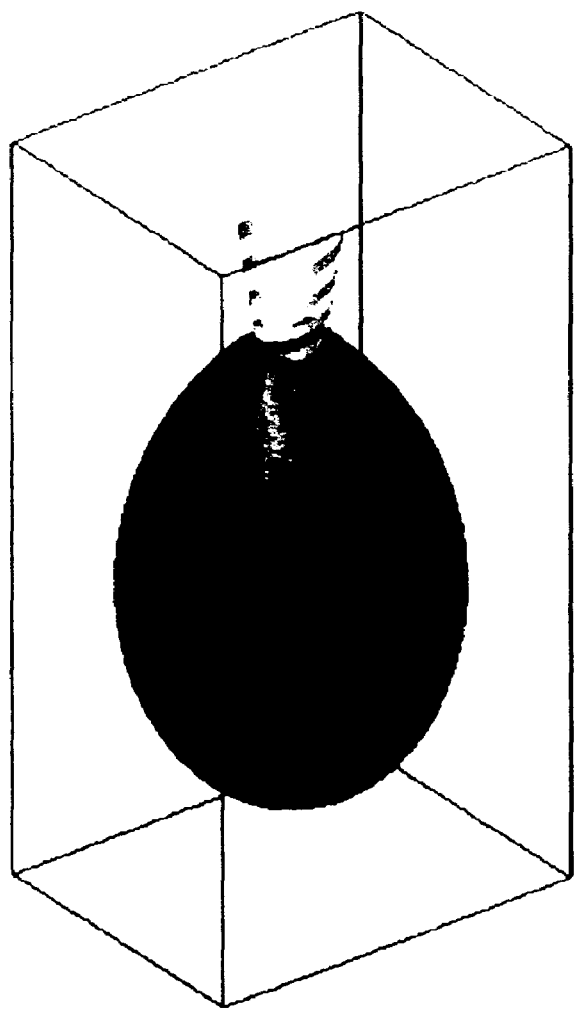

Fig 7. Polar plot of conical antenna at 500 Thz. Mathematically modeled by Dennis Prather at University of Delaware August 2004.
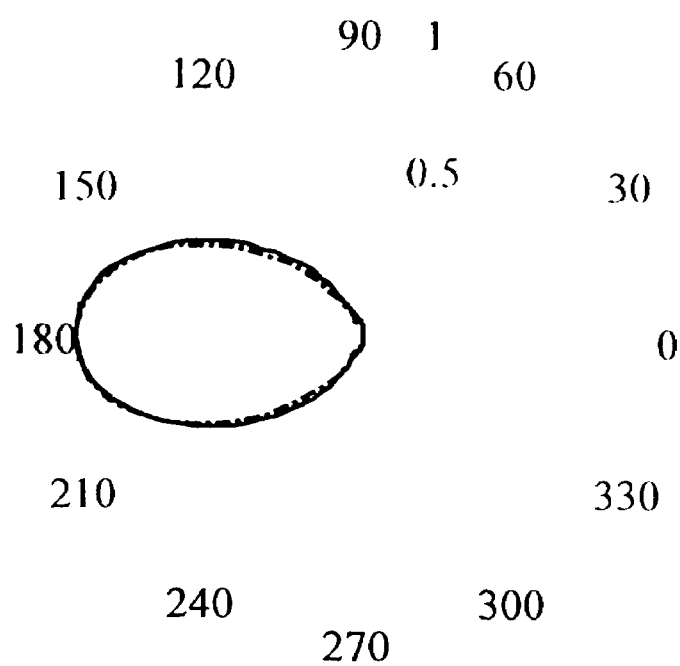

Fig. 8 Geometry of two arms planar spiral antenna.
Dennis Prather University of Delaware Aug 2004.
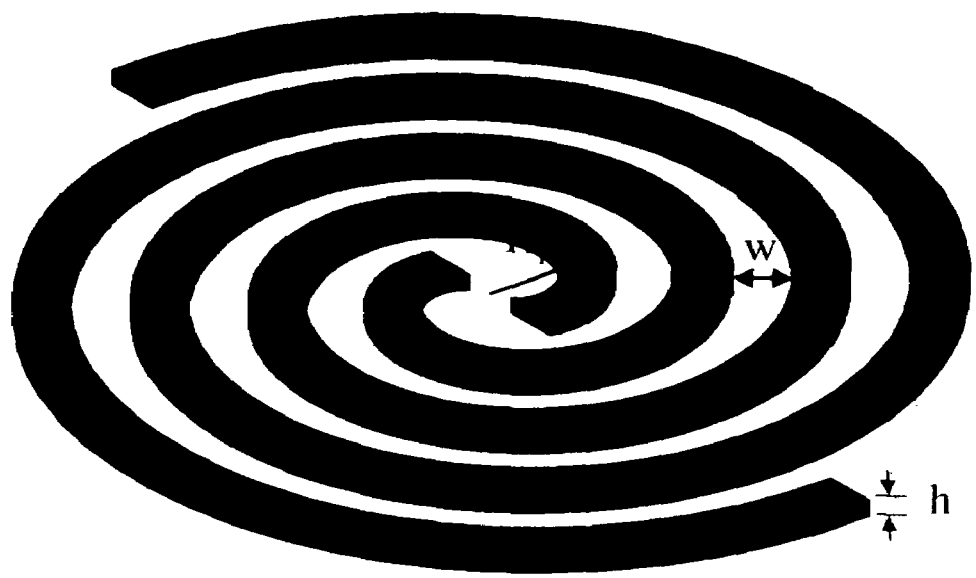
Number of turns: N Fig 9. Geometry of two arms conical spiral antenna.
Dennis Prather University of Delaware Aug 2004.
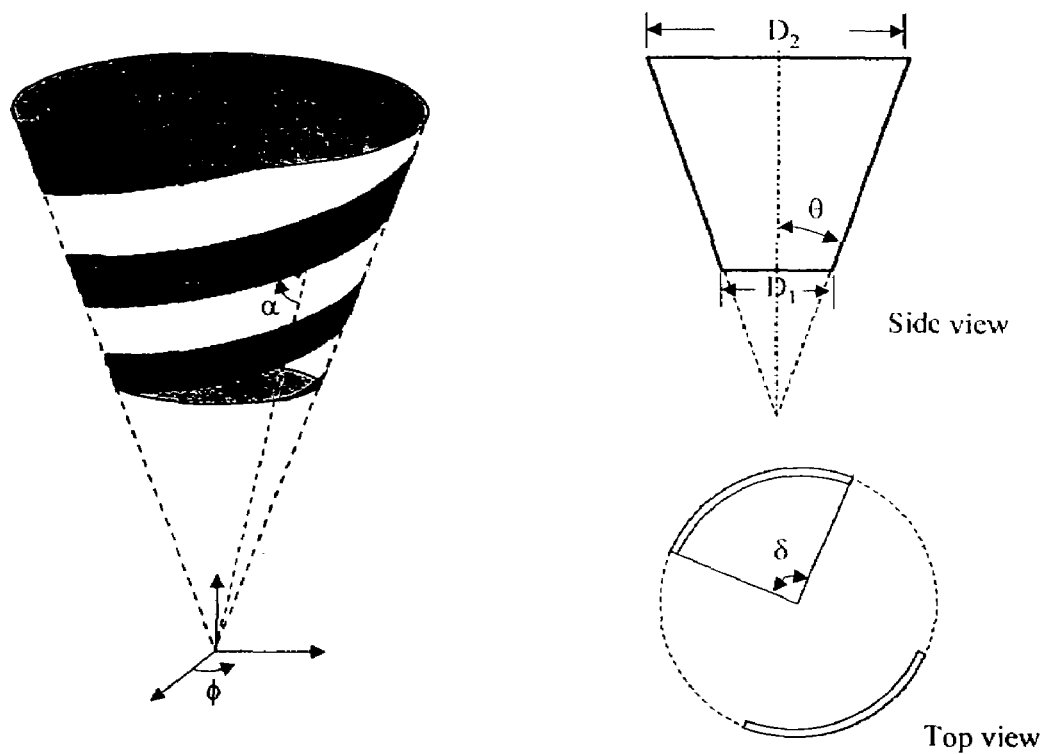

ELECTROMAGNETIC SPECTRAL-BASED IMAGING DEVICES AND METHODS

The present application claims priority from our provisional applications Ser. No. 60/527,328 filed on 5 Dec. 2003 and Ser. No. 60/529,691 dated 13 Dec. 2003 and filed on 15 Dec. 2003; these applications are hereby incorporated herein by reference.

TECHNICAL FIELD AND BACKGROUND ART

The present invention relates to imaging devices and methods, pertinent to electromagnetic energy in visual and other spectra, aimed at capturing and reproducing substantially all image information in a relevant spectrum.

In order to achieve truly full-spectrum images, it has long been deemed necessary to detect the full color gamut of the image, and not just the conventional three Red-Green-Blue (RGB) band-pass filtered colors. Most cameras detect color by separating the image into these three components, passing each component through an absorption filter and thence onto three detectors. Two-thirds of the light energy is lost in this process.

Recent studies have shown that while any color can be created by combining three colors, not all colors can be generated or detected by the use of a specific set of three colors. In other words, our reliance on metameric RGB color space models to create a full palate of colors is flawed.

Most electronic imaging detectors are composed of a large set of tiny light-sensitive semiconductors. Each cell of the set responds to the amplitude of the incoming light. Being photon detectors, the cells cannot in themselves distinguish color and thus several sets are used: for example, one each for red, green, and blue.

Electromagnetic radiation, which includes light, x-rays, and radio waves, can be characterized mathematically as waves as well as photons. At long wavelengths, e.g. radio frequencies, photons have little energy and the wave properties predominate for analysis. At shorter wavelengths, e.g. light, the photons have considerable energy and are currently used exclusively in designing light detecting systems.

It is known in the art that heterodyning can be used for detecting the spectral composition or spectral signature of complex infrared electromagnetic waveforms. In this technique, "an infrared source is combined with a laser local oscillator," in the manner described by Kostiuk (see references), "and focused on an infrared photometer, where the difference frequency between the source and laser frequencies is generated . . . . The resultant intermediate frequency . . . is in the radio region of the electromagnetic spectrum and it preserves the intensity and spectral information of the infrared spectrum. It can be analyzed using radio techniques, e.g., filter banks, autocorrelators, or acousto-optic spectrometers . . . . These determine the absolute spectral resolution." Similar techniques are known in the art for detecting the composition of millimeter wavebands. These heterodyning techniques essentially use optical methods to determine the absolute spectral resolution downshifted to the radio-frequency band. Such methods are too crude to resolve small increments of spectrum in the visible light wave region.

SUMMARY OF THE INVENTION

Embodiments of this present invention take advantage of the wave properties of light, and therefore use tiny components dimensioned to the wavelengths of light. Recent developments in nano-technology permit construction of wave-sensitive receivers, instead of photon-sensitive devices. These receivers can operate in the light range, with consequent low noise and tremendous sensitivity due to gain resulting from their inherent antenna construction.

Nano-structure antennas may be constructed by the following means: spiral-planar etched on silicon with deposition of a conductive material in the spiral format; spiral-embedded inside a conical structure deposited in layers; filling holes by electroplating in an appropriate material with a material applied in a matrix which is transparent to the wavelengths to be detected; carbon nanotubes grown to the dimensions of the wavelengths to be detected.

One embodiment of this invention reduces the size of an electromagnetic wave antenna so that it contains elements designed to resonate with wavelengths that cover the general visible light range. There are various architectures that may be used for such antennas. For example, it is known in the prior art that an antenna shaped as a helical tapered cone acts as a frequency analyzer, resonating at specific wavelengths depending upon the taper's cross-sectional dimensions.

A Yagi log periodic antenna, commonly used for television reception in the VHF and UHF electromagnetic wave bands, is typical of such a frequency analyzer. The basilar membrane in the human ear is another such tapered conical structure that does frequency analysis and detection in the audible range for sound waves. A further example may be the human retinal cones whose architecture resembles a tapered helix with the approximate dimensions necessary to detect electromagnetic waves in the light region.

In a first embodiment of the invention there is provided, using nanotechnology, an array of helical antennas, scaled in dimensions capable of detecting wavelengths in the visible light range. The electromagnetic waves resonate within the nano-technology scaled, tapered conical helixes acting as antennas.

In other embodiments of the invention, adjusting the construction and parameter size of the antennas enable them to sense electromagnetic energy ranging from the millimeter waveband, through infrared, visible light, to ultraviolet and X-rays.

We believe that strong evidence suggests that the human visual system detects complex electromagnetic waveforms of light directly and not via metameric bandpass filtering, such as the conventional red-green-blue absorption filters used in most cameras. We, therefore, have devised an improved imaging system that captures and presents the full spectral signature of a scene so as to present more and valuable information to the human visual perception system.

Another embodiment of this invention teaches the construction of an array for color imaging without the necessity of using conventional absorption bandpass filters to separate frequency bands. An essential ingredient for such a light-range wave-sensitive receiver is the ability to fabricate antennas with the dimensions of the wavelength of light. These antennas may incorporate high signal-to noise properties, e.g., gain at the wavelengths to be detected.

A method of fabrication of these nano antennas takes advantage of procedures in the prior art using the anodization of aluminum to create cylindrical micro pits whose dimensions and density are determined by the anodizing current density, bath chemistry, and the length of immersion in the anodizing bath. The anodizing process creates a layer of dense aluminum oxide on the surface of the aluminum. It is in this oxide that the micro holes form during the electrolytic process. The dimensions of the holes can readily be made commensurate with the wavelength of light.

By electroplating, these holes are subsequently filled with an appropriate material suitable for detecting electromagnetic waves in the lightwave range. The length of the rods that are so produced by filling the holes are dimensioned to match the wavelength to be detected. The rod matrix material, aluminum oxide, is transparent from 200 to 5,000 nanometers with an index of refraction of 1.760. Aluminum oxide, in a crystalline form, is known as sapphire.

In another embodiment of this invention, the rods can be of any transparent, conducting material that is capable of electrolytic deposition. There are a number of such suitable materials an example of which is stannous oxide. A conducting transparent film (e.g. stannous oxide) is applied on the top of the rods to provide an electrical connection. The aluminum sub-base provides the other connection. A cluster of rods of the same length acts as an antenna tuned to a specific frequency determined by that length. Incident light of that specific frequency will cause resonance in the rods that will cause a change in their electrical characteristics.

In another embodiment of this invention, a cluster of rods of different lengths acts an antenna tuned to a frequency range determined by the lengths of the rods in the cluster. The actual detected bandwidth is determined by the variation of the lengths of the rods in the cluster. The clusters themselves can have independent frequency sensitivities; each cluster having its own specific electrical connection on the top of the rods, but with the common aluminum substrate connection.

BRIEF DESCRIPTION OF THE DRAWINGS

The foregoing features of the invention will be more readily understood by reference to the following detailed description, taken with reference to the accompanying drawings, in which:

FIG. 5A illustrates the full sawtooth with a short duration, small-slope segment, sawtooth waveform actuating the scanning mirror;

FIG. 5B illustrates an exploded view of the short duration, small-slope segment, sawtooth waveform actuating the scanning mirror;

FIG. 6 is the radiation pattern of a conical antenna at 500 Thz;

FIG. 7 is the polar plot of a conical antenna at 500 Thz;

FIG. 8 is the geometry of a two arms planar spiral antenna;

FIG. 9 is the geometry of a two arms conical spiral antenna.

DETAILED DESCRIPTION OF SPECIFIC EMBODIMENTS

Definitions. As used in this description the following terms shall have the meanings indicated unless the context otherwise requires:

"Array" means a structured arrangement of elements. An "antenna array" in accordance with the present invention, however, does not necessarily have to provide outputs that are scanned linearly as in a CCD array for example. Rather, the elements may be sampled in a wide range of ways depending upon the desired operating environment.

"Spectral composition" means the spectral signature of a detected complex waveform.

"Decomposition" means the function of segmenting the signature into narrow bands for ultimate analysis. Colors as seen by humans are an example of spectral decomposition of visible light.

"Dithering" the sweeping of the frequency of a reference signal means substantially slowing the rate of sweeping of the reference signal. As described in connection with heterodyning below, this slowing is typically implemented to provide increased sensitivity and spectral resolution and to occur when, at a given instantaneous frequency of the reference signal, a detected intermediate frequency signal indicates a threshold level of spectral energy from a scene at a frequency corresponding to the instantaneous frequency.

Figure 1:
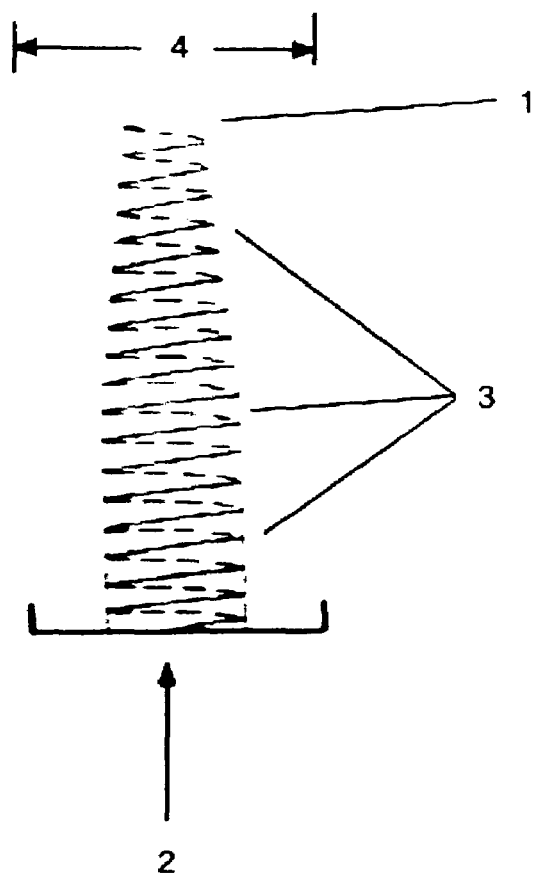
FIG. 1 is a color detecting pixel element in the form of a tapered conical antenna.

FIG. 1 illustrates an embodiment of the invention for one pixel of a sensor whereby a conical tapered antenna 1 detects the complex waveform of electromagnetic energy 2 propagating across helical antenna elements 3. As known in the art, a tapered antenna architecture is a receiving wave detector and frequency analyzer. A frequency analyzer is inherent in helical antenna design which delineates the peak energy for complex waveforms. The diameter dimensions 4 of the tapered helix 1 elements 3 are in the nanometer range. At nanometer dimensions, this tapered helical architecture detects electromagnetic waves in light and adjacent frequency bands. The diameter of the elements 3 . . . 3' in conical antenna 1 are in odd increments of the electromagnetic wave detected starting at ¼ wavelength to approximately twelve times the wavelength detected.

Figure 2:
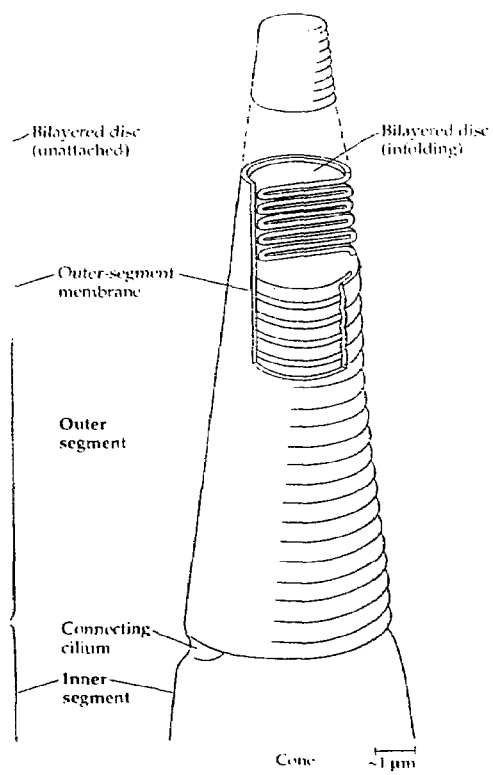
FIG. 2 is the analog of the invention to a human cone, in the form of a tapered conical helix.

FIG. 1 illustrates a structure, in accordance with an embodiment of the present invention, which parallels the structure of the human cone as illustrated in FIG. 2. The present embodiment acts in a manner similar to a common radio-wave antenna for television reception in the form of a tapered helix as illustrated in FIG. 9. In the present embodiment such an antenna is reduced to nanometer dimensions using nano-manufacturing technology. Its features make it a wave detector antenna and waveform analyzer with high gain and narrow entrance cone as illustrated in FIG. 6.

Embodiments of the present invention provide a camera system capable of capturing full spectrum images in the visible spectrum range without the use of traditional red-green-blue or cyan-magenta-yellow absorption bandpass filter sets or Bayer-pattern color filter arrays. By eliminating absorption filtration, the sensor's sensitivity is increased. The camera system of these embodiments operate, not in the amplitude domain in the manner of traditional imaging systems, but rather in the frequency domain. Operation in the frequency domain enables high dynamic range and low noise imaging.

Application of Heterodyning to Detection of Electromagnetic Spectral Composition.

Figure 3:
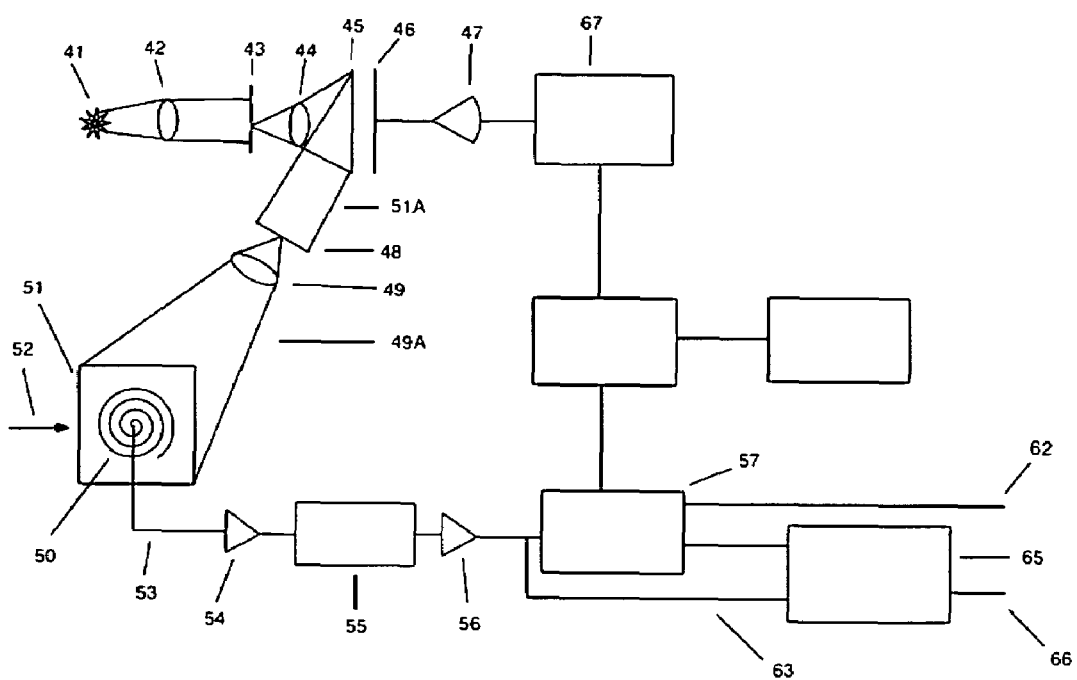
FIG. 3 is a functional schematic of an embodiment of an electromagnetic wave spectral composition detection system for static inputs.

In FIG. 3 is illustrated an embodiment of the invention for detecting the spectral composition of the electromagnetic energy incident on the sensor using heterodyning. This embodiment differs from known heterodyning art in that visible light is detected and downshifted to the radio frequency band for demodulation in a native digital mode. In this embodiment a full spectrum light source, such as a tungsten halogen lamp, is broken up into its spectral components. The spectrum is then scanned with narrow bandpass used for a reference signal, which is provided simultaneously to each antenna element of the array. As a result of heterodyning with the reference signal, each antenna element output includes a signal operating at a frequency that is the difference between the frequency of any input signal and that of the reference signal. Each antenna element output therefore includes a resulting signal that is reduced in frequency by the frequency of the reference signal, and the resulting signal may therefore be more easily demodulated.

Embodiments of the present invention apply heterodyning in a manner permitting spectrum resolution in the light wave bands. Referring to FIG. 3, light from a full-spectrum light source 41, such as a halogen source, is collimated by lens 42 and passes through a narrow slit 43. The slit is then focused by lens 44 onto an adjustable interference grating 45.

The grating 45 is mounted onto a piezo-electric substrate 46 whose linear dimensions and position can be controlled precisely by an applied voltage. In this way, the position of grating 45 and the angle of its spectral output is controlled by the voltage 47 applied to the piezoelectric element 46. An alternative embodiment is to form a grating on the surface of a movable mirror, such as the digital micro-mirror device manufactured by Texas Instruments.

The light 51A emerging from the grating passes through slit 48 whose purpose is to select a very narrow range of spectral frequencies. The range of frequencies is determined by the grating 45 blaze angle that is in turn determined by the piezo-electric element applied voltage 47.

The light 51A from the grating 45 passing through slit 48 is focused by lens 49 upon the electromagnetic imaging device coupling plate 51. Adjusting the grating's angular position with the voltage 47 controls the wavelength of the light, reference signal 49a, impinging on the coupling plate 51.

The sensor 50 in FIG. 3 is comprised of a number of detector pixels as shown and described in FIGS. 8 and 9. At each pixel, light from the image 52 mixes with the reference signal light 49a from the grating to yield an analog baseband output signal, 53. This signal is both the sum and difference of the two input signals. Reference signal 49a is swept across a range of frequencies by the voltage delivered by sawtooth generator 67. The voltage range of the sawtooth determines the excursion of the frequencies impinging on coupling plate 51 in close proximity to sensor 50.

The frequencies of input signal 52 and reference signal 49a produce heterodyned mixing products including, for example, an intermediate frequency of 100 MHz. The signal of the mixing products passes through a range within the 100 MHz passband of the low-pass filter 55. In this way the presence of a specific input light frequency 52 is detected by the presence of an analog baseband output signal 53.

To illustrate that this baseband detector can precisely determine the frequency of the unknown input 52, consider an example involving green light in the input. Green light has a wavelength of 550 nm, or a frequency of 545 THz. The intermediate frequency of 100 MHz resulting from the heterodyne between input 52 (receiving the hypothesized green light) and reference 49A corresponds to a very small color difference, namely 0.0001 nm. Thus the 100 MHz intermediate frequency used in this embodiment provides excellent color resolution.

Conductor 53 connects to amplifier 54 and subsequently to bandpass filter 55. Filter 55 has a pass band of 100 MHz, in concert with the example above. The output of filter 55 is then amplified by amplifier 56. The output of amplifier 56 operates gate 57. Gate 57 is turned on whenever a pulse occurs from amplifier 56. When gate 57 is turned on it allows the digital representation of the frequency in the form of a digital word to pass through gate 57 to output 62.

A controllable digital clock 60 drives a digital-to-voltage (D/V) converter 58 whose output via conductor 59 operates sawtooth generator 67. The digital output 61 of D/V converter 58, which is the voltage of the sawtooth generator 67 in digital form, connects to gate 57. Thus, when a pulse arrives at gate 57 from amplifier 56, the gate produces an output digital word 62, that is a digital representation of the frequency of input 52. The processes implemented by this structure therefore include sweeping the frequency of the reference signal repeatedly over a spectrum of interest, and associating an instantaneous sweep frequency of the reference signal with a detected corresponding amplitude of the intermediate frequency signal. The instantaneous sweep frequency in turn identifies a corresponding component of spectral energy (which will typically be at a frequency that differs, from the instantaneous sweep frequency, by the frequency of the intermediate frequency signal) from the scene received by the relevant antenna element.

There can be one or more such digital words 62, per sawtooth cycle, as each digital word 62 is a unique digital representation of a frequency component of input 52.

In order to determine the amplitude of the input signal 52, we need to digitize the amplitude component of the 100 MHz signal 53. This is accomplished by analog-to-digital to (A/D) converter 65 that takes the amplified 100 MHz signal via line 63 and converts it into a digital word 66, representing the signal amplitude whenever the A/D converter is activated by a signal from gate 57 via line 64.

There can be one or more such digital words 66, per sawtooth cycle, as each digital word 66 is a unique digital representation of an amplitude component of input 52.

Therefore the output of sensor 50 consists of two digital words: word 62 represents the spectral frequency of the input signal 52 being detected by a pixel of sensor 50; word 66 represents the amplitude input signal 52 being detected by a pixel of sensor 50 for each spectral component detected.

Dither technique to Provide Higher Speed Detection

The detection window of approximately 100 MHz is a minuscule fraction of the sweep range of the reference signal for visible light, covering 400-700 THz. This window amounts to only approximately 1 part in 5,000,000 of the sweep range. Therefore, the resulting time detection window for a one-second scan over the visible spectrum of 400-700 nm is only 500 ns. For static images where image capture time is not a factor, repeated scans at slower speed, as described in FIG. 3, will permit capture of low intensity wavelengths. However, for short transient fixed images and to capture moving images, alternative techniques may be implemented.

Figure 4:
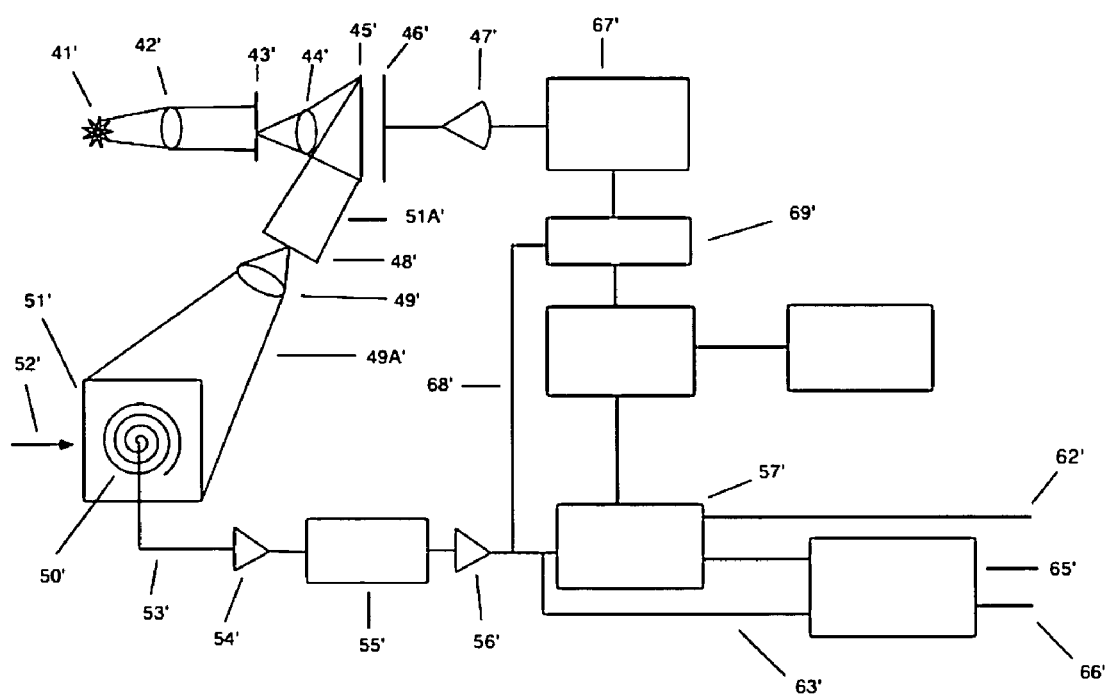
FIG. 4. is a functional schematic of another embodiment of an electromagnetic wave spectral composition detection system essentially the same as FIG. 3 with the addition of a dither processing control module for dithering the detector element to increase sensitivity for transient inputs.

An embodiment for transient images using a dither technique to capture spectral energy that may be at low amplitude is illustrated in FIG. 4. This technique would also permit implementation of motion-picture types of applications. In this embodiment, FIG. 4 modifies FIG. 3 with an additional dither control module 69'. The output words from amplitude byte 66' that represent the spectral energy detected are stored in dither control module 69'. A second scan identical to the one just completed is initiated except that the linear sawtooth being applied to the mirror actuator 46' is modified with the addition of a short duration, small-slope segment, illustrated in FIG. 5A. As an example, when the reference frequency reaches a value 200 MHz above that of the stored frequency in dither control module 69', the slope of the sawtooth, which is the dependency of the reference frequency with time, is deceased by a factor of 10,000 until the reference frequency reaches a value 200 MHz below the stored frequency value.

The actual numeric values used will depend upon the precise implementation and the actual range of frequencies scanned.

As illustrated in FIG. 5B, The reference beam is swept back and forth over the frequency range of interest at a rate, termed the dither rate, slower than the overall sawtooth sweep rate to enable the detector to adequately sample the input signal so as to ascertain its amplitude. The frequency range of interest is established where a signal had been detected during the initial scan, which then determines the dither location on the slope of the sawtooth. To provide increased sensitivity at the given instantaneous frequency, the embodiment herein thus involves dithering the sweeping of the frequency of the reference signal when at a given instantaneous frequency the intermediate frequency signal indicates a threshold level of spectral energy from the scene received by a relevant antenna element. Additional dithers are provided at all other detected signals stored in dither control module 69'.

The process in FIG. 3 is modified by FIG. 4 to provide this dither function to the sawtooth generator for each iterative sweep of the dithering process. Thus, when a pulse arrives at gate 57' from amplifier 56' the gate produces an output digital word 66' that is a digital representation of the amplitude from that sweep. Word 66' is transmitted on conductors 63' and its extension 68' to dither control module 69' which in turn transmits a voltage to sawtooth generator 67'. The sawtooth generator's output is now modified for the next dithered sweep. FIG. 5A and FIG. 5B illustrate the function generated by the dithering reference beam sweep signal 81 required to determine the incremental heterodyned dithered point 82. For clarity, one sweep across the spectrum necessary to generate a signal on conductor 59' in FIG. 4 is illustrated in FIG. 5A. A scan may require one or more dithered sweeps, illustrated in FIG. 5B, from voltage V0 (86) to V0−Δ (84) to V0+Δ (85) and back to V0 to generate a signal sufficient to demodulate the detected spectral frequency of signal 52' in FIG. 4. Dither signal 59' from dither control module 69' is processed by sawtooth generator 67' and output as voltage 47' to mirror actuator 46' which moves the grating 45' the equivalent of a spectral range of 200 MHz.

FIGS. 5A and 5B illustrate an example to detect a narrow band of 100 MHz around the 600 THz spectral point 82 in FIG. 5A. This value 82, which is stored in dither control module 69' (FIG. 4), represents the heterodyne detection point, also the voltage at time 0 (V0). Therefore, V0±Δ is the incremented voltage to move grating 45' (FIG. 4) 200 MHz. When the reference frequency light 49a' in FIG. 4 reaches a value 200 MHz above that of the frequency stored in dither control module 69' the slope of the signal continues but at a rate 1/10,000 of the original sweep rate until the reference frequency reaches a value which is 200 Mhz below the frequency value stored in 69'.

This dither is illustrated in FIG. 5B which explodes heterodyne detection point 82. Slope 83 is the dependency of the reference frequency with time. Value 82' is the voltage at time zero (V0), which is halfway along the rising slope representing the midpoint of the dither, equivalent to point 82 in FIG. 5A, the heterodyne detection point. Since Δ is equal to the change in voltage of V0 necessary to move grating 45' by 200 Mhz, grating 45' in FIG. 4 dithers between V0−Δ (point 84 in FIG. 5B) and V0+Δ (point 85 in FIG. 5B) repeating for n cycles in order to obtain a suitably robust detected signal; the quantity n depends on the signal's amplitude sufficient to make the signal readable by gate 57' in FIG. 4. When the signal is readable, value 82 is output as the image frequency detected, with an accuracy ±100 Mhz, converted to a digital byte on line 62' in FIG. 4.

The dither interval selected by the dither control module then moves the voltage up to point 85 in FIG. 5B for the next sweep, if more than one is required, or the next scan if the dithered spectral frequency has been optimized and output as value 82 by the sweep.

Other approaches to obtaining an acceptable reading of the input frequencies may be implemented. One such approach uses a repeating dither at the detected frequency, relying on additive signals from each repeat of the dither to increase the signal-to-noise ratio.

At the end of a dithered scan illustrated in FIG. 4, FIG. 5A and FIG. 5B the system reverts to normal operation as described in FIG. 3.

Other Electromagnetic Ranges

Another embodiment of the present invention uses antenna elements and a diffraction grating dimensioned to detect and analyze electromagnetic energy in the ultraviolet, infrared, x-ray, and millimeter wave ranges of the spectrum applying the architecture described in FIGS. 3 and 4 for detection and frequency analysis. The advantage over conventional photon detectors is the ability to segment such non-light wavelengths into small segments, down to less than 1 nanometer bandwidth or shorter bandwidths, something which cannot be done with optical filters. In one embodiment the invention provides a method of acquiring an image of a scene characterized by variations in electromagnetic spectral energy. This method includes:

1. Using an array of antenna elements to receive electromagnetic spectral energy from the scene, such an array capable of resolving spectral components having a wavelength of that of the millimeter band or less;
2. Obtaining an electrical output from each of the antenna elements in the array, the outputs collectively defining the distribution of energy in such spectral components.

In a related embodiment the invention treats proximate nano scaled array elements as having received coherent light waves, so as to produce phase data that can be used in processing element output under conditions when in fact non-coherent light is received by the array.

Clustered Antenna Elements

In a further related embodiment of the present invention the antenna elements in the array may be grouped into clusters. Each cluster is designed to cover a range of frequencies, and therefore each antenna element in the cluster may have a different length. The actual detected bandwidth is determined by the variation in the lengths of the antennas in the cluster. Each cluster in turn may be designed to cover a distinct frequency range and may also employ phased array processing.

The invention claimed is:

1. A method of acquiring an image of a scene characterized by variations in electromagnetic spectral energy, the method comprising:

a using an array of antenna elements to receive electromagnetic spectral energy from the scene, such array capable of resolving spectral components having a wavelength of that of the millimeter band or less, wherein each antenna element has dimensions in the nanometer range; and obtaining an electrical output from each of the antenna elements in the array, the outputs collectively defining the distribution of energy in such spectral components.

2. A method according to claim 1, wherein said array is a phased array.

3. A method according to claim 1, wherein each antenna element is one or multiple arm planar spiral and has dimensions in the nanometer range.

4. A method according to claim 1, wherein each antenna in the array is formed in a common block of crystalline material.

5. A method according to claim 1, further comprising:
with respect to each of the antenna elements, heterodyning a reference signal with spectral energy from the scene received by such antenna element, to produce an intermediate frequency signal; and
analyzing the intermediate frequency signal to characterize the spectral energy received by such element.

6. A method according to claim 5, further comprising;
sweeping the spectral frequency of the reference signal repeatedly over a spectrum of interest, and associating an instantaneous sweep frequency of the reference signal with a detected corresponding amplitude of the intermediate frequency signal to identify in turn a corresponding component of spectral energy from the scene received by such antenna element.

7. A method according to claim 6, wherein sweeping the frequency of the reference signal repeatedly is accomplished at a first average rate, the method further comprising:
dithering the sweeping of the frequency of the reference signal when at a given instantaneous frequency the intermediate frequency signal indicates a threshold level of spectral energy from the scene received by such antenna element, to provide increased sensitivity and spectral resolution at the given instantaneous frequency.

8. A method according to claim 1, wherein the antenna elements are dimensioned to detect electromagnetic energy in the X-ray range.

9. A method according to claim 1, wherein the antenna elements are dimensioned to detect electromagnetic energy in the ultraviolet range.

10. A method according to claim 1, wherein each antenna element is conical.

* * * * *